J. P. STOURM.

EGG HOLDER.

APPLICATION FILED APR. 5, 1920.

Reissued Dec. 21, 1920. 15,014.

INVENTOR
John P. Stourm

BY
F. Ledermann.
ATTORNEY

UNITED STATES PATENT OFFICE.

JOHN P. STOURM, OF NEW YORK, N. Y.

EGG-HOLDER.

15,014. Specification of Reissued Letters Patent. Reissued Dec. 21, 1920.

Original No. 1,278,248, dated September 10, 1918, Serial No. 850,941, filed July 14, 1914. Application for reissue filed April 5, 1920. Serial No. 371,565.

*To all whom it may concern:*

Be it known that I, JOHN P. STOURM, a citizen of the United States, residing at New York, in the county of New York and State of New York, have invented certain new and useful Improvements in Egg-Holders; and I do hereby declare the following to be a full, clear, and exact description of the invention, such as will enable others skilled in the art to which it appertains to make and use the same.

This invention relates to improvements in egg shipping devices, and has for one of its objects the provision of an article of this nature by which an egg may be suspended from a suitable support arranged in the body portion of the shipping box and resiliently held against breakage or displacement during transportation.

A further object of the invention resides in the provision of a novel form of egg suspending device that is simple and durable in construction, reliable and efficient in use, and which may be stamped and formed from a single blank sheet of material, whereby the cost of production may be a minimum.

A still further object of the invention resides in the provision of a novel form of shipping box in which said egg suspending devices are adapted to be supported.

With the above and other objects in view, the invention consists in the construction and combinations set forth in the following description and falling within the scope of the appended claims.

Figure 1:
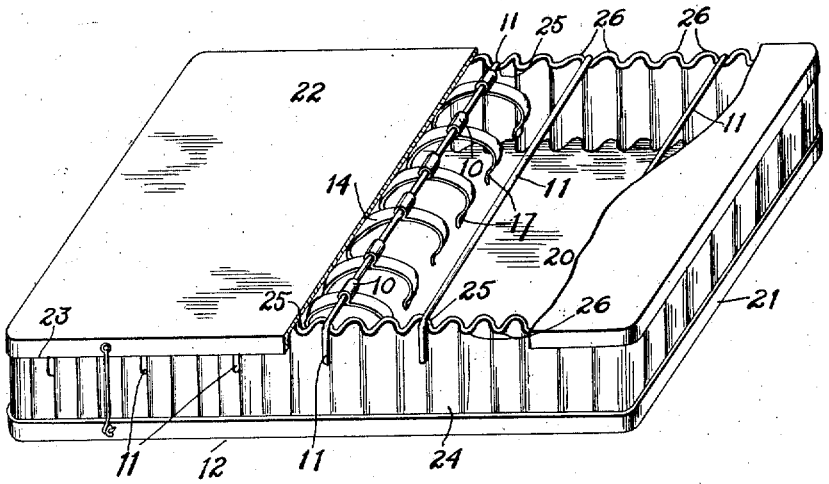

Referring briefly to the drawings, Figure 1 is a perspective view of the improved shipping device, with eggs packed therein ready for shipping.

Figure 2:
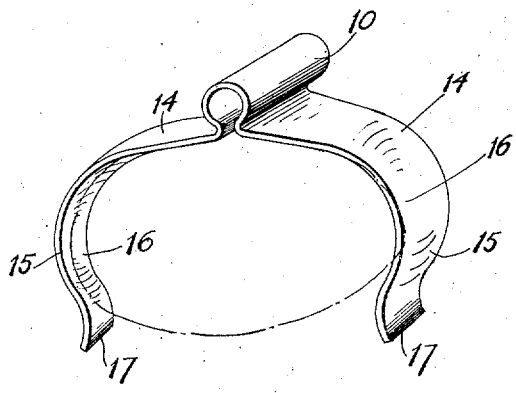

Fig. 2 is a perspective view of my novel egg suspending device.

Referring now in detail to the drawings, the egg holder comprises a single sheet or strip of material such as sheet steel, brass, or the like that is provided intermediate its ends with the loop 10 by which it is suspended from a supporting rod 11 arranged within the body of the shipping box which is indicated as a whole by the numeral 12.

The arms 13 of the strip are bowed outwardly from the loop as at 14 and curved adjacent their free ends to provide a pair of resilient gripping members 15 between which an egg is adapted to be securely held, the curvature of one of said members being such as to receive the butt of the egg and that of the other of said members to receive the point of the egg. The arms 13 are further transversely bowed as at 16 to prevent lateral displacement of the egg therefrom and terminally provided with downwardly projected finger pieces 17 by which they may be readily spread to permit of the insertion of an egg therebetween or the removal of the same therefrom.

It will be noted that the portions of the holder between the gripping members 15 and the loop 10 are disposed in spaced relation to the egg, such space permitting of flexing of the arms 13 to absorb the jars and shocks to which the eggs may be subjected during transportation.

The box in which the holders are arranged consists of the bottom member 20 having an upturned edge 21 and a top member 22 having a downturned edge 23. Between the top and bottom members and standing snugly against the upturned edge portions 21 and 23 is a continuous corrugated metallic strip 24. As noted in Fig. 1 of the drawings, the strip 24 is provided with deep corrugations 25 and relatively shallower corrugations 26, each deep corrugation being followed in succession by two shallow corrugations, and then a deep corrugation.

The rods 11, upon which the holders are hung, have their downturned end portions engaged within the deep corrugations which are directly inward of the box, as illustrated in the drawings, the top or cover member 22 of the box resting upon the loops 10 of the holders and therethrough serving to hold the rods 11 against upward displacement.

As above stated, the egg holding member consists of a strip of resilient material such as sheet metal. Each egg holding member is disposed to receive within its loop or sleeve 10 one of the supporting or hanger rods 11 and by reason of the resiliency of the material, this sleeve will of course grip the rod and prevent the egg holder from sliding along the rod. Any swinging movement of the holder on the rod would of course be limited by contact of the holder with the lid of the box. The holder being of resilient material as stated, the sleeve may of course be readily sprung by drawing apart the gripping members 15, to an extent sufficient to permit of sliding of the holder to whatever position is desired upon the rod, thus to suit eggs of different dimensions.

Having thus described my invention, what I claim and desire to secure by Letters Patent is as follows:

1. The combination with an open top box having its side walls provided with corrugations extending through their top edges, of a hanger bar having downturned ends removably disposed exteriorly of the walls and within reëntrant corrugations thereof, egg holders suspended from the hanger rod and a closure for the box having a flange bridging the outer recesses of the corrugations whereby outward bending of the ends of the hanger bar from the corrugations is prevented.

2. A two-part hanger for an egg container consisting of a bar having downturned end portions for engagement over and against the outer faces of the sides of a container and a resilient metal holder including a central resilient split sleeve engaging the bar and arms extending from opposite sides of the split of the sleeve curvingly, first in mutual divergent and then in mutual convergent relation and formed to fit corresponding superficial portions of an egg.

3. An egg holder comprising a bar and a resilient member having a central resilient split sleeve slidably engaging said bar.

4. An egg holder comprising a bar and a resilient member having a central resilient sleeve slidably engaging said bar, said member adapted to be securely retained at any point on said bar.

5. An egg holder comprising a bar, a resilient member having a central resilient sleeve engaging said bar, and curved arms extending from opposite sides of said sleeve.

6. An egg holder comprising a bar, a member including a central split sleeve and arms extending from opposite sides of the split of said sleeve, said arms being curved first in a mutually divergent relation and then in a mutually convergent relation, and formed to retain an egg therebetween.

7. An egg holder comprising a bar, a member including a central resilient sleeve and curved arms depending therefrom first in a mutually divergent relation and then in a mutually convergent relation, and formed to retain an egg therebetween.

JOHN P. STOURM.